(12) United States Patent
Couture et al.

(10) Patent No.: US 7,001,145 B2
(45) Date of Patent: Feb. 21, 2006

(54) SEAL ASSEMBLY FOR TURBINE, BUCKET/ TURBINE INCLUDING SAME, METHOD FOR SEALING INTERFACE BETWEEN ROTATING AND STATIONARY COMPONENTS OF A TURBINE

(75) Inventors: Bernard Arthur Couture, Schenectady, NY (US); Farshad Ghasripoor, Scotia, NY (US); Mark William Kowalczyk, Amsterdam, NY (US)

(73) Assignee: General Electric Company, Schenectady, NY (US)

( * ) Notice: Subject to any disclaimer, the term of this patent is extended or adjusted under 35 U.S.C. 154(b) by 264 days.

(21) Appl. No.: 10/716,447

(22) Filed: Nov. 20, 2003

(65) Prior Publication Data

US 2005/0111967 A1 May 26, 2005

(51) Int. Cl.
F01D 11/02 (2006.01)

(52) U.S. Cl. ............................... 415/173.4; 415/173.5; 415/173.6

(58) Field of Classification Search ............ 415/173.4, 415/173.5, 173.6, 174.4, 174.5, 196, 197; 277/411, 412, 415

See application file for complete search history.

(56) References Cited

U.S. PATENT DOCUMENTS

| 899,319 | A | * | 9/1908 | Parsons et al. .......... 415/173.5 |
|---|---|---|---|---|
| 3,339,933 | A | * | 9/1967 | Foster ........................ 277/415 |
| 4,127,358 | A | | 11/1978 | Parkes |
| 4,184,797 | A | | 1/1980 | Anderson et al. |
| 4,292,008 | A | | 9/1981 | Grosjean et al. |
| 4,460,185 | A | | 7/1984 | Grandey |
| 4,767,267 | A | | 8/1988 | Salt et al. |
| 5,049,032 | A | * | 9/1991 | Brandon ................... 415/170.1 |
| 5,096,376 | A | | 3/1992 | Mason et al. |
| 5,224,713 | A | | 7/1993 | Pope |
| 5,226,789 | A | | 7/1993 | Donges |
| 5,350,277 | A | | 9/1994 | Jacala et al. |
| 5,388,959 | A | | 2/1995 | Forrester et al. |
| 5,482,435 | A | | 1/1996 | Dorris et al. |
| 6,340,286 | B1 | | 1/2002 | Aksit et al. |
| 6,375,429 | B1 | | 4/2002 | Halila et al. |
| 6,464,453 | B1 | | 10/2002 | Toborg et al. |
| 6,533,285 | B1 | * | 3/2003 | Nava et al. .................. 277/415 |
| 6,547,522 | B1 | | 4/2003 | Turnquist et al. |
| 2003/0106214 | A1 | | 6/2003 | Mortzheim et al. |

FOREIGN PATENT DOCUMENTS

JP      59115403 A  *  7/1984

OTHER PUBLICATIONS

U.S. Ser. No. 10/284,259, filed Dec. 2002, unknown.

* cited by examiner

*Primary Examiner*—Ninh H. Nguyen
(74) *Attorney, Agent, or Firm*—Nixon & Vanderhye P.C.

(57) ABSTRACT

A rotary machine includes a rotatable rotor, buckets radially mounted on and spaced apart about the rotor, a stationary stator/casing disposed about and radially outward from the rotor defining an annular gap between the casing and tips of the buckets, and an abradable seal member provided to the bucket tip portions and disposed within the annular gap such that during differential growth of the rotor and buckets relative to the casing the seal member abrades in response to contact with a base seal member provided to the stator casing. Thereby, clearance between the stator casing and bucket tips is minimized between the moving bucket tips with the stator casing.

29 Claims, 3 Drawing Sheets

SEAL ASSEMBLY FOR TURBINE, BUCKET/TURBINE INCLUDING SAME, METHOD FOR SEALING INTERFACE BETWEEN ROTATING AND STATIONARY COMPONENTS OF A TURBINE

BACKGROUND OF THE INVENTION

The present invention generally relates to rotary machines, such as steam and gas turbines, and, more particularly, is concerned with a rotary machine having a seal assembly to control clearance between tips of rotating rotor blades or "buckets" and a stationary outer casing or stator of the rotary machine. Specifically the invention relates generally to an abradable seal member provided to the rotating portion of a turbine. The invention also relates to a turbine and/or turbine bucket including an abradable seal member, and a method for sealing an interface between rotating and stationary components of a turbine or other machine.

Steam and gas turbines are used, among other purposes, to power electric generators, and gas turbines also are used, among other purposes, to propel aircraft and ships. A steam turbine has a steam path which typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Compressor and turbine sections include at least one circumferential row of rotating buckets. The free ends or tips of the rotating buckets are surrounded by a stator casing.

The efficiency of the turbine depends in part on the radial clearance or gap between the rotor bucket tips and the surrounding casing. If the clearance is too large, more of the steam or gas flow will leak through the gap between the rotor bucket tips and the surrounding casing, decreasing the turbine's efficiency. If the clearance is too small, the rotor bucket tips may strike the surrounding casing during certain turbine operating conditions.

It is known that the clearance changes during periods of acceleration or deceleration due to changing centrifugal force on the bucket tips, due to turbine rotor vibration, and due to relative thermal growth between the rotating rotor and stationary casing. During periods of differential centrifugal, rotor vibration, and thermal growth of the rotor and casing the clearance changes can result in severe rubbing of the moving bucket tips against the stationary casing. This increase in bucket tip clearance results in efficiency loss.

Clearance control devices, such as abradable seals, have been proposed in the past to accommodate rotor-to-casing clearance change. See, for example, U.S. Pat. Nos. 6,340,286 and 6,547,522, both assigned to General Electric Company. This protection feature allows the designer to decrease the cold built clearances of the turbine or engine, which decreases unwanted leakage, thus improving the performance and/or efficiency of the turbine or engine. The abradable seal or coating is typically applied to the stationary components, with the seal segments machined into and/or caulked into the rotor assembly.

However, these solutions are not believed to represent an optimum design for controlling such clearance. Consequently, a need still remains for an innovation which will provide a solution to the above-described clearance control problem without introducing any new problems in place thereof.

BRIEF DESCRIPTION OF THE INVENTION

One aspect of the invention is to provide a rotary machine with a seal assembly designed to satisfy the above needs.

In one embodiment, a seal assembly for a turbine having a rotor with at least one bucket and a stator forming, in part, a main casing for the rotor, comprises a base seal member configured to be positioned on an inside surface of the main casing, and an abradable seal member designed and configured for application to a tip portion of the at least one bucket. The abradable seal member is positionable in facing relation to the base seal member.

In another embodiment, there is provided a bucket for a turbine comprising a main body having proximal and distal end portions, the proximal end portion including structure to secure it to a rotational drive element and the distal end portion including an air foil part, and an abradable seal member provided to the distal end portion of the main body.

In yet another embodiment, there is provided a method for sealing an interface between a tip portion of a rotor bucket and an inside surface of a stator casing of a turbine. The method comprises positioning a base seal member on the inside surface of the stator casing, and providing an abradable seal member to a tip portion of the at least one bucket, in facing relation to the base seal member.

In still another embodiment, there is a turbine comprising a rotor including at least one bucket, a stator defining a main casing for the rotor, and a seal assembly including a base seal member configured to be positioned on an inside surface of the main casing, and an abradable seal member designed and configured for application to a tip portion of the at least one bucket, the abradable seal member being positionable in facing relation to the base seal member.

These and other aspects of preferred embodiments will be described in conjunction with the following drawings.

DETAILED DESCRIPTION OF THE INVENTION

The present invention is a rotary machine. Rotary machines include, without limitation, centrifugal compressors, generators, and turbines. Turbines include, without limitation, steam turbines and gas turbines. Turbines have, without limitation, compressor sections and turbine sections. Although the invention is hereinafter described in terms of a turbine, it is understood that the invention is not so limited and applies to any rotary machine as will be appreciated by those skilled in the art. It is noted that FIG. 1 shows only a portion of a rotary machine, such portion including, among other elements, a casing and a rotor of a turbine.

Figure 1:
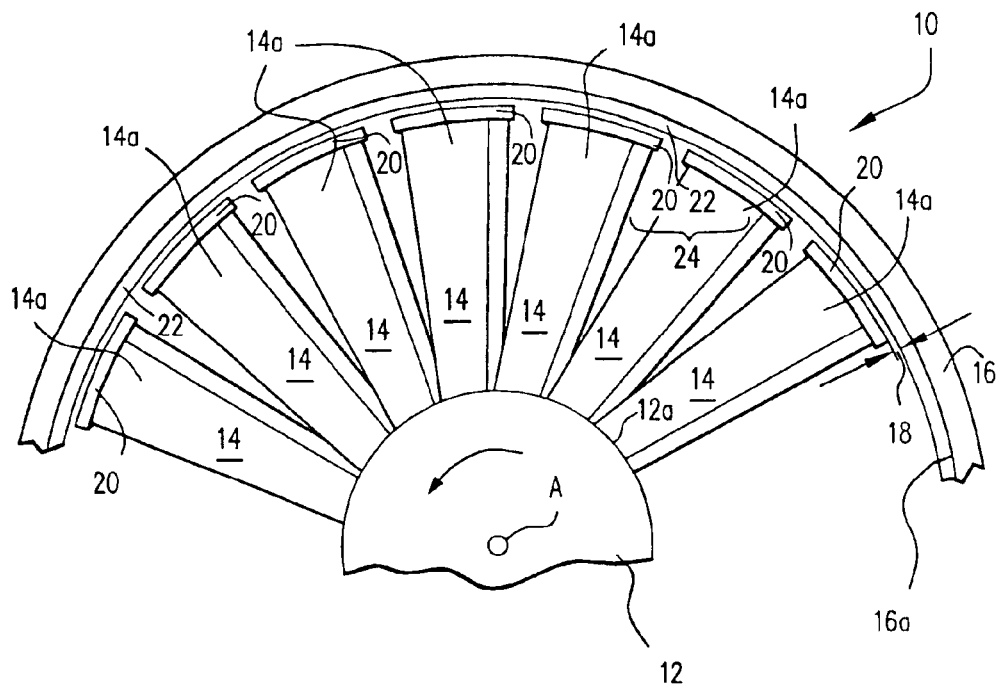
FIG. 1 is a schematic view of an embodiment of the present invention.

Referring now to the drawings and particularly to FIG. 1, there is illustrated in a diagrammatical form a turbine, generally designated 10, of one embodiment of the present invention having a rotor 12 rotatable about a central longitudinal axis A and having an outer annular surface 12a. A plurality of buckets 14 are provided to, e.g., fixedly mounted on the outer annular surface 12a of the rotor 12. The buckets 14 are spaced from one another circumferentially about, and extend radially outward from the outer annular surface 12a of the rotor 12 to end tips 14a of the buckets 14. The end tips 14a of each bucket 14 may include an air foil type shape. An outer casing 16 has a generally annular and cylindrical shape and an inner circumferential surface 16a that is stationarily disposed about and spaced radially outwardly from the rotor 12 and buckets 14 so as to define an annular gap 18 between the inner circumferential surface 16a of the outer casing 16 and the end tips 14a of the rotor buckets 14. The annular gap 18 in practice can be a predetermined distance in the range of about 0.250 mm to about 2.05 mm, with a tolerance between about 0.0250 mm and 0.1 mm. Of course, other predetermined distances and tolerances are contemplated depending on the application.

An abradable seal member 20, e.g., of a relatively soft material, is provided to the end tips 14a of the buckets 14. The abradable seal member 20 is disposed within the annular gap 18 defined between the inner circumference 16a of the casing 16 and the end tips 14a of the buckets 14 rotating with the rotor 12. During periods of differential growth of the rotor 12 and buckets 14 relative to the casing 16, the seal member 20 abrades in response to contact therewith by the stationary casing 16. As such, direct contact between the moving bucket tips 14a and the stationary casing 16 results in a localized cavity and the clearance 18 between the stationary casing 16 and the moving buckets 14 is thereby controlled by the seal members 20.

In one embodiment, the seal member 20 may cooperate with a base seal member 22 to form an overall seal assembly 24. The base seal member is provided to the inside surface 16a of the casing 16. The base seal member 22 may be positioned on the inside surface 16a of the casing 16 in any known suitable manner, such as by adhesives, mechanical fasteners, or the like. The casing 16 which forms part of the stator and the rotor 12 are constructed such that the abradable seal member 20 of the bucket 14 will allow base seal member 22 to cut a groove into the abradable seal member 20, if, in operation, contact occurs between the seal member 20 and the base seal member 22.

The base seal member 22 may be designed as a modular, replaceable insert selectively insertable within the inside surface 16a of the casing 16. The base seal member 22 may be either a knife-edge strip or seal strip, or a combination thereof.

The seal member 20 may take the form of an abradable coating provided to, e.g., sprayed on, the tips 14a of each bucket 14. Each bucket 14 includes a proximal end which is connected to the rotor 12 and a distal end which includes the bucket tip 14a. The distal end of the bucket includes the abradable seal member 20. The abradable seal member 20 may also be a separate layer that is fastened to the bucket tips 14a, using adhesives and/or mechanical fasteners, etc.

Figure 2:
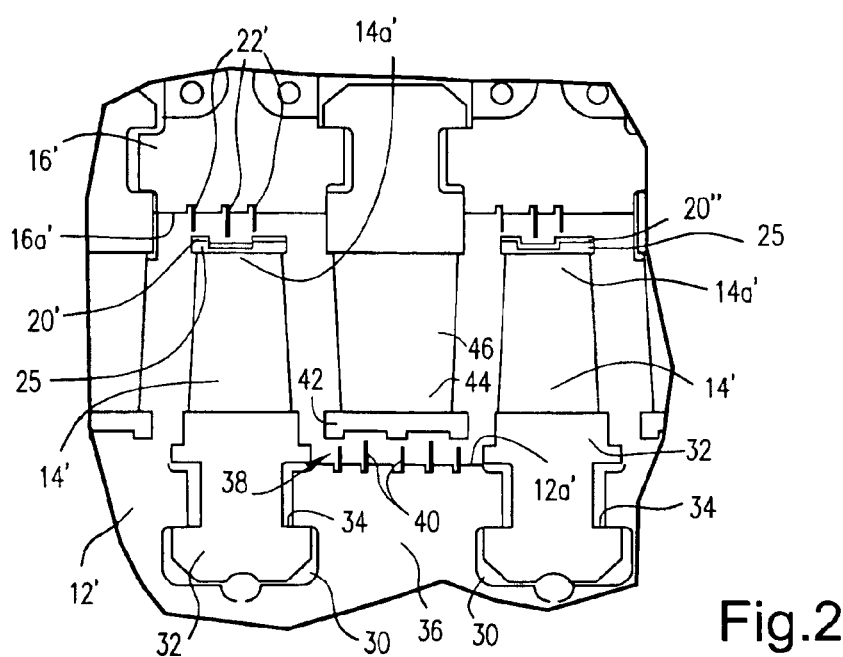
FIG. 2 depicts an alternative embodiment of the present invention.

FIG. 2 illustrates another embodiment of the present invention. In FIG. 2, a plurality of buckets 14' are provided to a rotor 12'. The proximal ends of each bucket are connected to the rotor 12'. The distal end of each bucket 14' is provided with or connected to a bucket cover 25. Bucket covers are known in the art. See, e.g., U.S. Pat. No. 5,350,277 to General Electric Company. The bucket cover 25 includes an abradable seal member 20' which is placed in facing relation to the inside surface 16a' of the casing 16'. The casing 16a' includes one or more base seal portions 22', e.g., in the form of a knife seal. The base seal portion 22' can also take the form of a strip seal, which is well known in the art.

In FIG. 2, the bucket on the left hand side includes a seal member provided on each horizontal surface, but not the vertical surfaces, of the bucket cover. The bucket on the right hand side includes a seal portion 20" that is slightly different in that the horizontal and vertical surfaces of the bucket cover are covered with the seal portion 20". Of course, the bucket cover could include a substantially flat surface, as shown in FIG. 3, as opposed to the stepped bucket cover configuration shown in FIG. 2.

Figure 3:
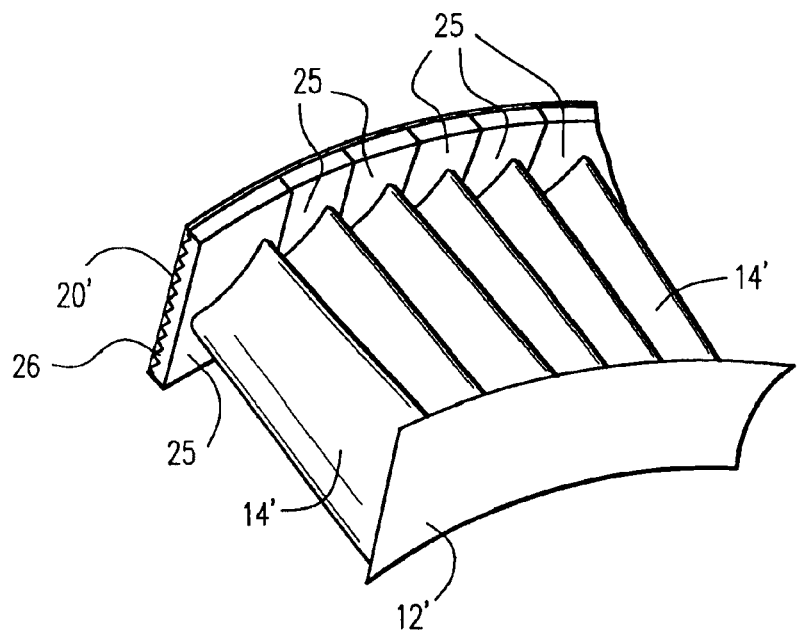
FIG. 3 schematically illustrates a portion of a circumferential row of buckets from the embodiment illustrated in FIG. 2.

To facilitate the application of a spray coating as the abradable seal member 20, 20' the tip 14a of each bucket 14 or the bucket cover 25 may include one and preferably a plurality of teeth 26, as shown in FIG. 3. FIG. 3 is a schematic view of a plurality of buckets 14' and corresponding bucket covers 25. The provision of teeth 26 and/or grooved/scored/roughened surfaces may facilitate and/or encourage adhesion of the seal member, e.g., abradable coating layer, to the tips 14a or the bucket covers 25. As is known in the art, the bucket covers 25 of adjacent circumferential buckets 14 may include engaging and/or interlocking surfaces, like a puzzle, to thereby provide an integral and/or substantially uninterrupted continuous surface for a given row of buckets, as schematically shown in FIG. 3.

Another embodiment of the present invention is directed to a method for sealing an interface between a tip portion of a rotor bucket and an inside surface of the stator casing of a turbine. The method includes positioning the base seal member 22, 22', e.g., a knife seal or strip seal, on the inside surface 16a, 16a' of the stator casing 16, 16' and providing an abradable seal member, e.g., 20 or 20', to a tip portion of at least one bucket in facing relation to the base seal member 22, 22'. The method can apply to any rotating components of a machine, and is not limited to application to a turbine.

In a simplified form, one aspect of the invention is simply to provide an abradable seal member to the rotating component rather than the stationary component. This shift in location was difficult as application of an abradable seal member, e.g., a coating, to the rotor was unproven at the time Applicants conceived the invention. In addition, despite the risk of providing the abradable seal at this new location, Applicants have achieved significant success. The risk with shifting the location of the abradable seal member involved, among other things, in one embodiment, providing integral teeth to the tips or bucket covers, possibly more complications in spraying, the possible addition of substantial cycle time and the higher risk of spallation of the abradable seal member at this location, and consequently higher risk of performance loss.

According to embodiments of the present invention, the equipment designer may decrease the cold built clearances of the turbine or engine, which decreases unwanted leakage, thus improving the performance of efficiency of the turbine or engine.

After the abradable seal member is provided to the rotating component, e.g., after the coating is applied to the bucket tip or bucket cover, the component can be machined to tolerance and balanced. The base seal member 22, 22', e.g., knife-edge or strip seals, may be placed in the stationary components (e.g., the casing 16). The cold built tolerances can therefore be set tighter than normal, in the ranges noted above. If the rotating part contacts the seal member, the abradable seal member will allow the base seal members to cut a groove into the rotating component without damage to the base seal member 22, 22', e.g., knife-edge or strip seals.

As shown in FIG. 2, the rotor 12' includes an outer surface 12a' including a plurality of channels 30 to receive a row of the buckets 14'. The base 32 of each of the buckets 14' in a row is configured to be slidingly received with the channel 30. However, the base 32 includes a shoulder 34 that is larger than the opening of the channel 30, to thereby prevent radial movement of the buckets 14'.

An island 36 is provided on the rotor 12' between adjacent channels 30. In FIG. 2, the island 36 includes a base seal member 38, e.g., at least one and preferably a plurality of knife seal portions 40. The knife seal portions 40 form a labyrinthian seal with seal member 42 provided on the distal end portion 44 of a nozzle vane 46 which is keyed to the stator casing 16'.

Figure 4:
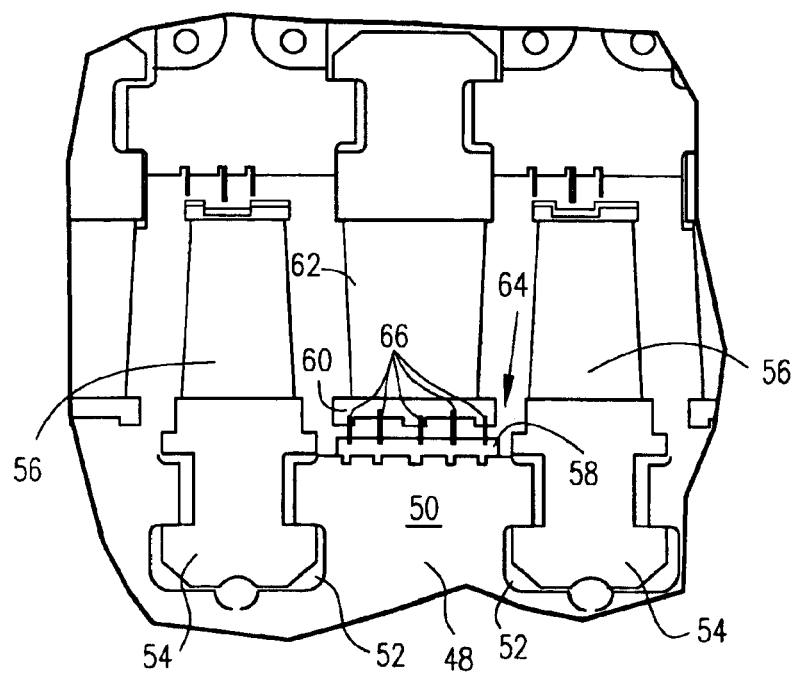
FIGS. 4–6 illustrate yet another alternative embodiment of the present invention.

FIG. 4 shows an alternate embodiment of a seal assembly according to the present invention. In particular, the rotor 48 includes an island 50 provided between adjacent channels 52 for accommodating the base members 54 of buckets 56. However, the island 50 is provided, e.g., sprayed, with an abradable seal member 58 like that described above, while distal end portion 60 of nozzle vane 62 includes a base seal member 64, e.g., a plurality of knife seal members 66.

Figure 5:
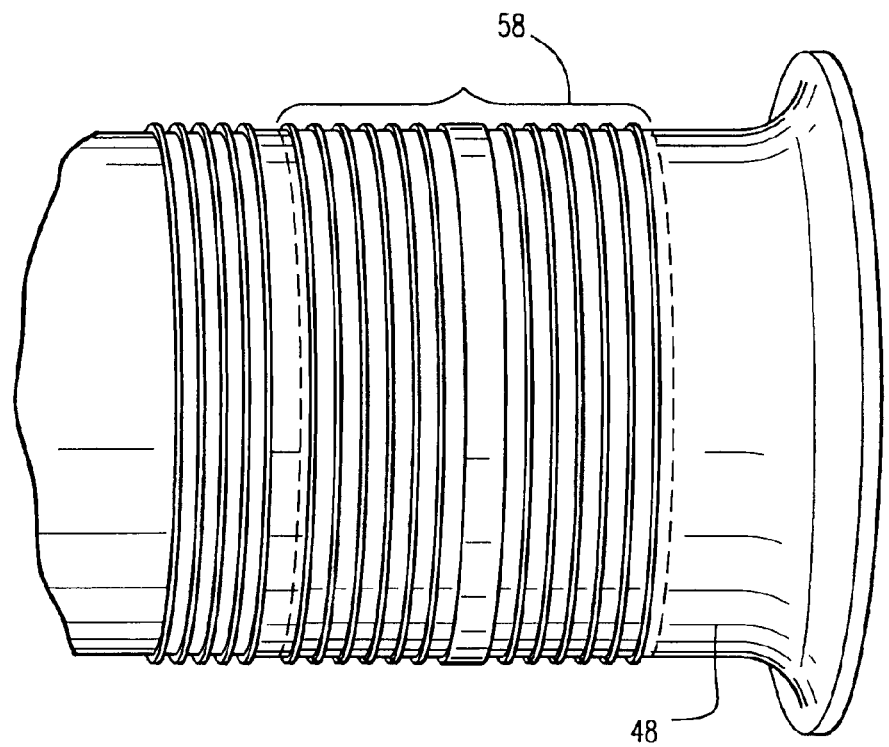
Figure 6:
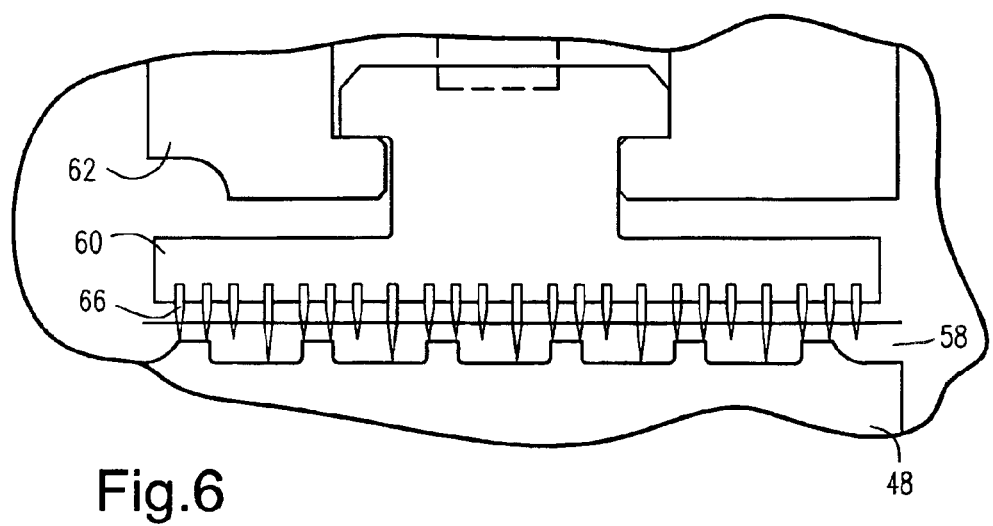

FIG. 5 illustrates the rotor 48, with the buckets 56 being removed for clarity. In this example, the abradable seal member 58 is fitted or sprayed onto the outer surface of the rotor 48, such that it covers the various grooves and raised portions on the rotor 48. Only a portion of the axial extent of the rotor 48 is provided with the abradable seal member 58, as indicated by the bracket and the dotted lines. However, a smaller axial extent or a larger axial extent (including the entire axial extent) could be provided with the abradable seal member 58. FIG. 6 is an enlarged cross-sectional view of a portion of the knife seal members 66 on the distal end portion 60 of the nozzle vane 62, in relation to the abradable seal member 58 provided on the rotor 48.

Without the need to machine or install the knife-edge or strip seals in the rotor, the rotor is more durable, and the likelihood of having to perform repairs on the rotor in the field is greatly reduced. This allows the knife-edge or strip seals to be placed in the stationary components, where they can be installed as replaceable inserts. This greatly reduces the likelihood of prolonged rework or delays during the installation or repair of a turbine assembly.

Other advantages of the structure include reduced clearances to allow rub during transient operation and retaining the knife-edge or strip seals in the stationary components, which greatly enhances the repairability/availability of the turbine. One possible additional benefit is that the addition of the abradable seal, e.g., a coating, reduces the effects of variance in efficiency caused by manufacturing and assembly processes, which impact cold clearances, thus improving the likelihood that multiple units of the same design or product line will have similar performance during operation.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A seal assembly for a turbine having a rotor with at least one bucket and a stator forming, in part, a main casing for the rotor, the seal assembly comprising:
   a base seal member configured to be positioned on an inside surface of the main casing; and
   an abradable seal member designed and configured for application to a tip portion of the at least one bucket, said abradable seal member being positionable in facing relation to the base seal member,
   wherein the base seal member is designed as a modular, replaceable insert selectively insertable within the inside surface of the main casing.

2. The seal assembly of claim 1, wherein the inside surface of the main casing is designed to be spaced a predetermined distance from the tip portion of the bucket, within a predetermined tolerance.

3. The seal assembly of claim 2, wherein the predetermined distance is between about 0.250 mm and about 2.05 mm and the predetermined tolerance is between about 0.0250 mm and about 0.1 mm.

4. The seal assembly of claim 2, wherein the stator and rotor are constructed such that the abradable seal member of the at least one bucket will allow the base seal member to cut a groove into the abradable seal member, if, in operation, contact occurs between the abradable seal member and the base seal member.

5. The seal assembly of claim 1, wherein the abradable seal member is a coating.

6. The seal assembly of claim 1, wherein the base seal member includes at least one knife edge.

7. The seal assembly of claim 1, wherein the base seal member includes a seal strip.

8. A method for sealing an interface between a tip portion of a rotor bucket and an inside surface of a stator casing of a turbine, the method comprising:
   positioning a base seal member on the inside surface of the stator casing;
   providing an abradable seal member to a tip portion of the at least one bucket, in facing relation to the base seal member; and
   designing the base seal member as a modular, replaceable insert selectively insertable within the inside surface of the main casing.

9. The method of claim 8, further comprising designing the inside surface of the stator casing to be spaced a predetermined distance from the tip portion of the bucket, within a predetermined tolerance.

10. The method of claim 9, wherein the predetermined distance is between about 0.250 mm and about 2.05 mm and the predetermined tolerance is between about 0.0250 mm and about 0.1 mm.

11. The method of claim 9, wherein the stator and rotor are constructed such that the abradable seal member of the at least one bucket will allow the base seal member to cut a groove into the abradable seal member, if, in operation, contact occurs between the abradable seal member and the base seal member.

12. The method of claim 8, wherein the abradable seal member is a coating.

13. The method of claim 8, wherein the base seal member comprises at least one knife edge.

14. The method of claim 8, wherein the tip portion includes a bucket cover, and said abradable seal member is provided on said bucket cover.

15. The method of claim 8, wherein the base seal member includes a seal strip.

16. A turbine comprising:
   a rotor including at least one bucket;
   a stator defining a main casing for the rotor; and
   a seal assembly including:
      a base seal member positioned on an inside surface of the main casing; and an abradable seal member provided to a tip portion of the at least one bucket, said abradable seal member being positionable in facing relation to the base seal member, wherein the base seal member is designed as a modular, replaceable insert selectively insertable within the inside surface of the main casing.

17. The turbine of claim 16, wherein the inside surface of the main casing is designed to be spaced a predetermined distance from the tip portion of the bucket, within a predetermined tolerance.

18. The turbine of claim 17, wherein the predetermined distance is between about 0.250 mm and about 2.05 mm and the predetermined tolerance is between about 0.0250 and about 0.1 mm.

19. The turbine of claim 17, wherein the stator and rotor are constructed such that the abradable seal member of the at least one bucket will allow the base seal member to cut a groove into the abradable seal member, if, in operation, contact occurs between the abradable seal member and the base seal member.

20. The turbine of claim 16, wherein the abradable seal member is a coating.

21. The turbine of claim 16, wherein the base seal member includes at least one knife edge.

22. The turbine of claim 16, further comprising a bucket cover provided to the tip of the bucket, the abradable seal member being provided to the bucket cover.

23. The turbine of claim 16, wherein the abradable seal member is provided directly to a distal end of the tip portion of the bucket.

24. The turbine of claim 16, wherein the at least one bucket includes a bucket cover.

25. The turbine of claim 24, wherein the bucket cover has an outer surface including at least one of a tooth, scoring, grooving and roughening to promote secure fixing of the abradable seal member to the outer surface of the bucket cover.

26. The turbine of claim 16, wherein the base seal member includes a seal strip.

27. A turbine comprising:

a rotor including at least one bucket;

a stator defining a main casing for the rotor; and a seal assembly including:

a base seal member positioned on an inside surface of the main casing; and an abradable seal member provided to a tip portion of the at least one bucket, said abradable seal member being positionable in facing relation to the base seal member, wherein the stator includes a nozzle vane provided with a supplemental base seal member and the rotor includes an outer surface provided with a supplemental abradable seal, in facing relation with the supplemental base seal member.

28. A turbine comprising:

a rotor including an outer surface and at least one bucket extending away from the outer surface;

a stator having at least one nozzle vane and defining a main casing for the rotor; and a seal assembly including:

a base seal member configured to be positioned on a distal end portion of the nozzle vane; and an abradable seal member designed and configured for application to the outer surface of the rotor, said abradable seal member being positionable in facing relation to the base seal member.

29. The turbine of claim 28, wherein the base seal member includes a plurality of knife seals and the abradable seal member is a coating.

* * * * *